United States Patent
Teel et al.

(10) Patent No.: US 9,914,589 B1
(45) Date of Patent: Mar. 13, 2018

(54) AUTOMATED FEEDER CHUTE SYSTEM

(71) Applicants: John Teel, Skiatook, OK (US); J. W. Teel, Jr., Skiatook, OK (US)

(72) Inventors: John Teel, Skiatook, OK (US); J. W. Teel, Jr., Skiatook, OK (US)

( * ) Notice: Subject to any disclaimer, the term of this patent is extended or adjusted under 35 U.S.C. 154(b) by 0 days.

(21) Appl. No.: 15/480,553

(22) Filed: Apr. 6, 2017

(51) Int. Cl.
*B65G 11/20* (2006.01)
*B65G 11/12* (2006.01)

(52) U.S. Cl.
CPC ............ *B65G 11/20* (2013.01); *B65G 11/126* (2013.01); *B65G 2812/083* (2013.01)

(58) Field of Classification Search
CPC .......................... B65G 11/126; B65G 11/206
USPC ........ 193/2 R, 4, 21; 198/671; 414/516, 519
See application file for complete search history.

(56) References Cited

U.S. PATENT DOCUMENTS

| | | | | |
|---|---|---|---|---|
| 2,538,413 A * | 1/1951 | Chard | ................... | A01K 39/014 119/51.11 |
| 2,818,163 A * | 12/1957 | Hilblom | ............. | B65G 47/5195 198/536 |
| 4,540,086 A * | 9/1985 | David | ................ | A01D 41/1208 198/536 |
| 5,348,138 A * | 9/1994 | Seemann | ............... | B65G 33/24 198/657 |
| 6,974,021 B1 * | 12/2005 | Boevers | ............. | A01D 41/1217 198/550.2 |
| 7,584,836 B2 * | 9/2009 | McCully | ................ | B65G 33/08 198/531 |
| 7,938,613 B2 * | 5/2011 | Yoder | ................ | A01D 41/1217 198/550.1 |
| 8,336,492 B1 * | 12/2012 | Barley | ...................... | A01K 5/00 119/51.04 |
| 8,366,372 B2 * | 2/2013 | Yoder | ................ | A01D 41/1217 198/550.1 |
| 8,474,597 B2 * | 7/2013 | Pier | .................... | B65G 47/1407 198/389 |
| 8,876,456 B2 * | 11/2014 | Kowalchuk | ............ | A01D 87/00 198/314 |
| 9,468,145 B2 * | 10/2016 | Coppinger | ......... | A01D 41/1217 |
| 2009/0272619 A1 * | 11/2009 | Leal et al. | | |

\* cited by examiner

*Primary Examiner* — Douglas Hess
(74) *Attorney, Agent, or Firm* — Jerry D Haynes; Law Office of Jerry D Haynes, PA

(57) ABSTRACT

An automated feed chute system for a cube feeder that includes: a feed chute, where the feed chute includes a closed position, an open position or any desired position in between; a mounting pin extending from one side of the feed chute; an opening mechanism, where the opening mechanism engages the mounting pin; and a mechanism to remotely activate the actuator. The opening actuator mechanism includes an arm that attaches to the mounting pin on the feed chute. The feed chute includes a pivot point, where the feed chute pivots about the pivot point to move the feed chute between the closed position, open position or any desired position in between. Preferably, the means to automatically activate the opening mechanism is a remote control.

4 Claims, 1 Drawing Sheet

AUTOMATED FEEDER CHUTE SYSTEM

BACKGROUND OF THE INVENTION

Field of Invention

The present invention relates to an automated feeder chute that remotely lowers a feeder chute

Description of Related Art

A cube feeder is commonly used to distribute feed in the farming industry in particular as related to cattle feeding. The cube feeder is usually placed on a flatbed truck and a chute is provided that lowers to allow the distribution of feed from the cube feeder. The chute is typically manually lowered, raised, and maneuvered into position for the distribution of feed from the cube feeder. However, this task could be difficult, laborious and even dangerous in certain instances. Therefore, some automatic systems have been developed to assist in this process of feed distribution. Such systems usually include the use of a hydraulic cylinder, hydraulic lines and pump, which take up additional space on the truck bed, and has the possibility of a hydraulic oil leak. As a result, further innovation is needed with respect to the operation of the feeder chute extending from the cube feeder.

SUMMARY OF THE INVENTION

The present invention relates to an automated feed chute system for a cube feeder that includes: a feed chute, where the feed chute includes a closed position, an open position or any desired position in between; a mounting pin extending from one side of the feed chute; an opening mechanism, where the opening mechanism engages the mounting pin; and a means to remotely activate the opening mechanism. The opening mechanism arm engages the mounting pin. The feed chute includes a pivot point, where the feed chute pivots about the pivot point to move the feed chute between the closed position and open position. Preferably, the means to automatically activate the opening mechanism is a remote control.

DETAILED DESCRIPTION

The present invention relates to automated feeder chute system that automatically lowers a feeder chute for distribution of feed within a cube feeder. The present invention includes an opening device that has an arm that engages a mounting pin that extends from the feeder chute. Once engaged with the mounting pin, the arm extends in a horizontal position therefore forcing the lowering of the feeder chute. Once in this lower position feed may be distributed down a feeder canal of the feeder chute. This automated system includes for remote control activation that activates the movement of the arm engaged with the feeder chute.

Figure 1:
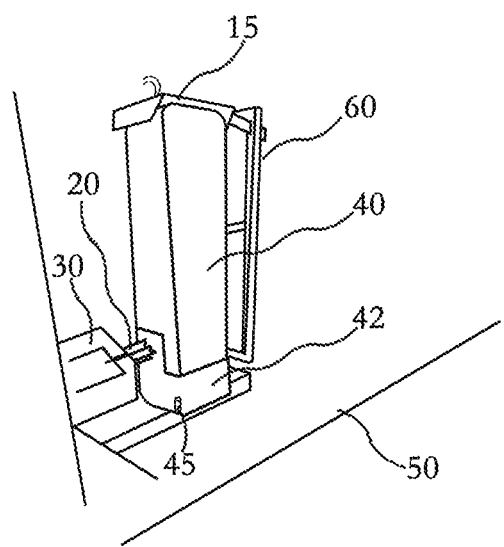
FIG. 1 depicts a feeder chute in a closed position in accordance with the present invention.

In reference to FIG. 1, a feeder chute system in accordance with the present invention is depicted. The Cube Feeder 60 and a Feeder Chute 40 as shown on FIG. 1. A Cover 15 covers the Feeder Chute 40 when the Feeder Chute 40 is in a closed position as shown in FIG. 1. The Feeder Chute 40 provides the means for the distribution of feed from the Cube Feeder 60 when placed in a lower position.

Figure 2:
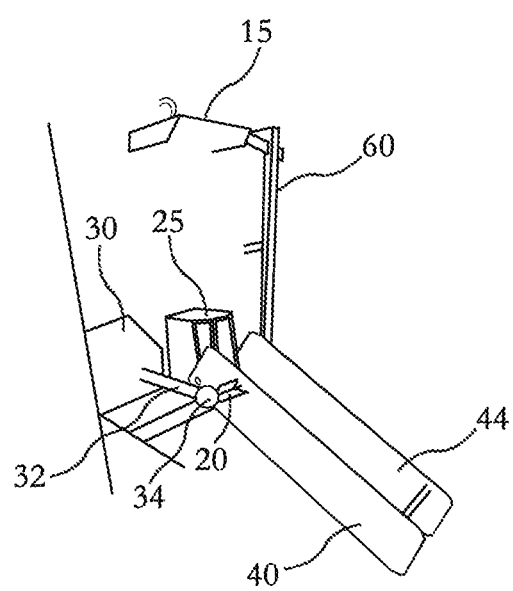
FIG. 2 depicts release of the feeder chute in accordance with the present invention.

FIG. 2 depicts the Feeder Chute 40 in a lower position where a Feed Canal 44 is exposed and allows for the distribution of feed from Auger 25 shown in FIG. 2. When in a closed position as shown in FIG. 1, other components of the Feeder Chute 40 may be seen such as the Pivot Point 45 at the bottom of the Feeder Chute 40. The Feeder Chute 40 pivots across this point and lowers onto an Edge 50 of a flatbed truck. A Mounting Pin 20 extends from one side of the Feeder Chute 40 that engages with a Rod 32 at Connector 34, where the Rod 32 extends from an Opening Device 30 as more clearly shown in FIG. 2. At the bottom of the Feeder Chute 40 shown in FIG. 1 is a Reinforcement Plate 42. This Reinforcement Plate 42 allows for strengthened support at the Pivot Point 45 of the Feeder Chute 40.

Shown in FIG. 2, the opening device includes an Actuator Arm 32 that extends horizontally and is engaged with the Mounting Pin 20. Although, not shown, an actuator is provided to move the Arm 32 along the horizontal plane. When engaged, the Opening Device 32 may be remotely activated to effectively cause the lowering of the Feeder Chute 40. The Feeder Chute 40 is shown in a fully lowered position in FIG. 2 with a clear view of the Arm 32 connected to pin 20 on chute 40.

Using this device according to the present invention, a user therefore may remotely lower and further retract the feeder chute of a cube feeder. This effectively reduces labor involved in handling feed from the feeder chute and functions in a manner that does not encroach upon the space of the cube feeder. The instant invention has been shown and described in what it considers to be the most practical and preferred embodiments. It is recognized, however, that departures may be made there from within the scope of the invention and that obvious modifications will occur to a person skilled in the art.

What is claimed is:

1. A remote controlled feed chute system for a cube feeder comprising:
   a. a feed chute, where the feed chute includes a closed position, an open position or any desired position in between;
   b. a mounting pin extending from one side of the feed chute;
   c. an opening mechanism, where the opening mechanism engages the mounting pin;
   d. a means to remotely activate the opening mechanism;
   e. a cover, wherein the cover covers the feed chute in a closed position; and
   f. a feed canal within the feed chute;
   g. an auger wherein the auger distributes feed into the feed canal; and
   h. a reinforcement plate at the bottom of the feed chute.

2. The remote controlled feed chute system according to claim 1, where an actuator mounted under the cube feeder engages the mounting pin on the feed chute.

3. The remote controlled feed chute system according to claim 1, where the feed chute includes a pivot point, where the feed chute pivots about the pivot point to allow the feed chute between the closed position, the open position or to any position desired in between.

4. The automated feed chute system according to claim 1, where the means to remotely activate the opening mechanism is a remote control.

\* \* \* \* \*